April 1, 1969  R. A. OHLBAUM  3,435,869
THREADED FASTENER ASSEMBLY
Filed May 3, 1967

INVENTOR.
ROBERT A. OHLBAUM
BY Ernest J Weinberger
Louis B. Appleton
ATTORNEYS 3,435,869
THREADED FASTENER ASSEMBLY
Robert A. Ohlbaum, 105—10 62nd Road,
Forest Hills, N.Y. 11375
Filed May 3, 1967, Ser. No. 637,039
Int. Cl. F16b 39/00
U.S. Cl. 151—15                    1 Claim

ABSTRACT OF THE DISCLOSURE

The fastener assembly includes a bolt having a relatively coarse thread which passes through the member or members which are to be compressively loaded thereby. The base of the bolt head tightly abuts one member and a differential nut having a hex head is threaded on the bolt. The differential nut is provided with inner threads to mate with those of the bolt and relatively fine outer threads which mate with those of a castellated base nut. The base nut bears against the second member and by preventing rotation of the bolt while applying a known torque via torque wrench to the differential nut which does not bear against the second member, the members are compressed between the base nut and the bolt head. Since there is no rotation of any component of the fastener which abuts the members while they are being compressed, the inherent problem of sliding friction is eliminated and the compressive loading is directly related to the torque applied.

---

The invention described herein may be manufactured and used by or for the Government of the United States of America for governmental purposes without the payment of any royalties thereon or therefor.

BACKGROUND OF THE INVENTION

Field of the invention

This invention relates to compressional devices and more particularly to a fastener assembly combination which can apply a selected compressional preload to the structures which are to be fastened. Essentially the above includes superimposed nuts which are thread locked.

DESCRIPTION OF PRIOR ART

Prior methods and devices for preloading in a compressive direction where bolts have been employed, necessitate both the use of a precision micrometer or a vernier depths gauge and a torque wrench. Further, these measuring instruments must be employed at relatively frequent intervals during the tightening process. The need for these additional measurements is due to the fact that the elongation of the bolt is the only measure of the force being applied to produce the compression. Clearly these techniques are, first, limited to those structures in which the bolt is readily accessible and secondly to the hands of a skilled technician. As for example, these prior methods are not applicable to studs, and the like or to those bolts which are fatigued by the elongational forces.

SUMMARY OF THE INVENTION

The invention herein specifically comprises a nut and bolt arrangement for accurately preloading abutting members to preclude fatigue failure. The bolt is passed through a suitable opening in the members and is provided with a threaded portion which cooperates with a differential nut having a coarse inner thread and a relatively fine outer thread. A second nut threadably engages the outer threads of the differential nut while the inner threads thereof cooperate with the coarse inner bolt threads. A calibrated, standard torque wrench is employed to tighten the bolt and the differential nut to selectively preload the members.

There are attendant advantages herein, in that a reduced torque can be employed with large bolts by properly selecting the thread pitch of the differential nut and the elasticity of the bolt is present without the usual narrowing down and weakening of the bolt.

An object of this invention is to provide a novel threaded fastener assembly which is simple, inexpensive, reliable and which can preload a pair of members to a selected condition with only the use of a torque wrench.

Another object is to provide a fastener which may be accurately adjusted by unskilled personnel to selectively preload without the use of verniers.

Other objects and advantages will appear from the following description of an example of the invention, and the novel features will be particularly pointed out in the appended claims.

DESCRIPTION OF THE PREFERRED EMBODIMENTS

Figure 1:
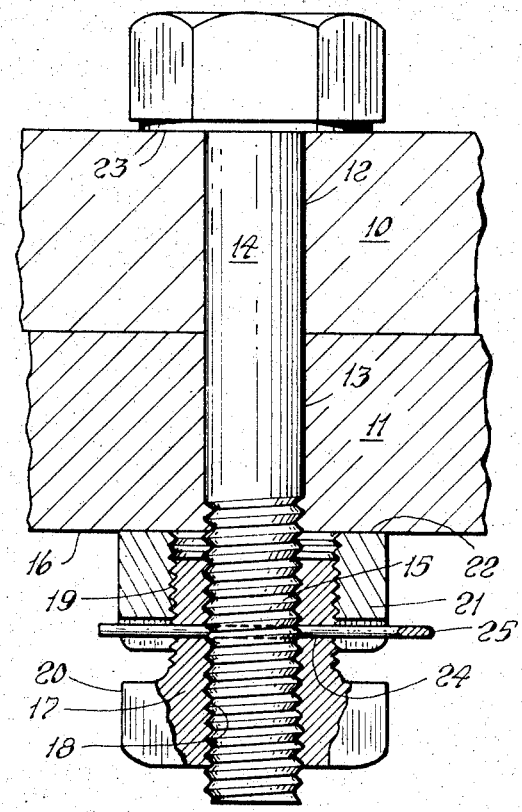
FIG. 1 is a cross-sectional view of an embodiment made in accordance with the principle of this invention.

In the illustrated embodiment of FIG. 1, the two members 10 and 11 which are to be secured together are provided with aligned apertures 12 and 13 through which passes bolt 14. The threaded portion 15 of the bolt 14 depends below the lower surface 16 of member 11 and thereat engages a differential nut 17. The differential nut 17 has an inner set of relatively coarse threads 18 mating with those of bolt portion 15 and relatively fine threads 19 on the outer upper surface thereof which terminates at the hex head 20. Disposed in mating engagement with the outer threaded surface of the differential nut 17 is a castellated base nut 21 whose upper face 22 bears directly on the lower surface 16 of member 11.

In order to insure a relatively elastic bolt the surface area 23 under the head of the bolt and the upper face 22 of nut 21 should be at least 1½ times the cross-sectional area of the bolt shank. The area directly under compression substantially exceeds the area of the bolt thus significantly increasing the elasticity bolt in comparison to the directly clamped material.

In assembling the structure the bolt is passed through the aligned opening in the members to be clamped and the differential nut threaded part way into the base nut. The differential nut is then threaded on to the bolt by hand until the face 22 of the base nut abuts the lower surface 22 of member 11. The assembled threaded fastener is then preloaded with a torque wrench whose torque is applied to the differential nut. It is of course good practice to apply standard lubricants to the threads before assembly in order to minimize any inherent thread friction. Clearly, the base nut and the bold head will not rotate (as by restraining them) so that by tightening the differential nut, which does not contact the surfaces of either member, all the high intermediate sliding friction is eliminated. This permits the torque applied, to be the determining factor with respect to the preloading of the bolt without the necessity of employing any form of linear measurement such as a vernier. The elimination of this sliding friction through the structural employment of the differential nut which does not contact any of the abutting surfaces and the fact that the base nut is not threaded to the bolt permits direct preloading. In order to adequately secure the fastener assembly after it has been preloaded the bolt is transversely drilled to provide a passage 24, through which is passed a cotter pin 25.

Figure 2:
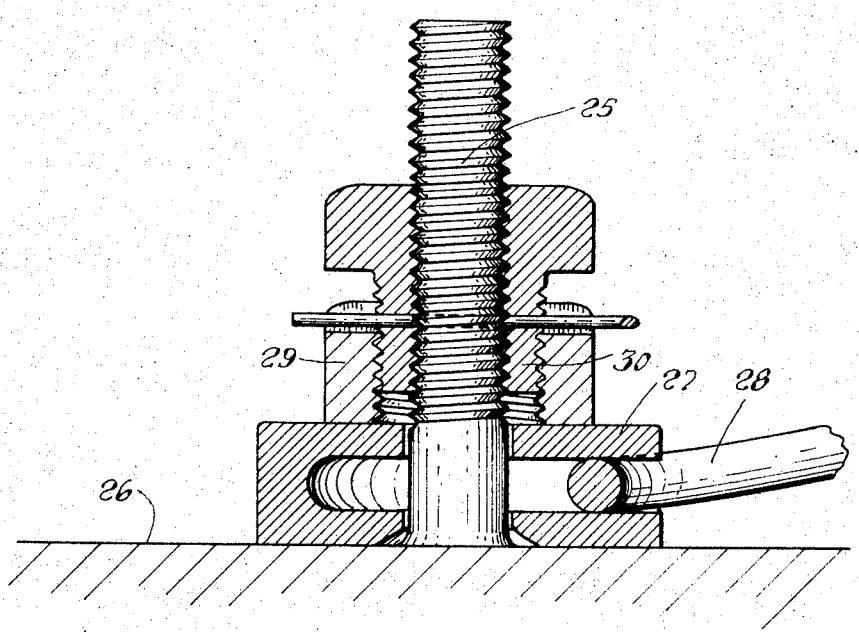
FIG. 2 is a perspective view of another embodiment as applied to a stud type arrangement.

The fastener assembly is shown in FIG. 2 as applied to a stud 25 which in this case extends from the deck 26 of a ship and it is desired to clamp a structure such as a restraining ring 27 for a guide wire 28 thereto. The ring is initially placed over the stud and a base nut 29 partially threaded onto the differential nut 30. The differential nut is thereupon threaded to mate with the threads of the stud 25 and tightened with a torque wrench. Under these conditions it would be extremely difficult due to the inaccessibility to use a micrometer or a depth gage to ascertain the loading.

It should also be noted that preloading has always required a measurement of bolt elongation while this invention provides a consistent tension-torque relation thus facilitating the use of a torque wrench. Precise preloading is generally employed to prevent the fastener from being under cyclic stress while the fastened members are under cyclic load or vibration thus precluding bolt fatigue.

I claim:
1. A fastener assembly for clamping together in abutting relation members having aligned passages which comprises:
   a bolt disposed in said passages having a threaded end portion extending through and beyond the opposite face of one of said members, the surface area of the head of said bolt abutting the other of said members is at least one and one half times the cross-sectional area of said bolt,
   a differential nut having an inner thread mateable with said end portion of said bolt and threaded thereon but spaced from said one of said members and also having an outer threaded portion, whose threads are finer than those of said inner thread,
   a castellated base nut disposed in abutting relation with said opposite face of said one member and threaded on said outer thread of said differential nut the area of said base nut abutting said one of said members is at least one and one half times the cross-sectional area of said bolt, said bolt being provided with an aperture extending transversely therethrough and aligned with an aperture through said base and differential nuts, and
   a cotter pin disposed in said aperture for locking said assembly,
   whereby when a known torque is applied to said differential nut, said bolt and said base nut being rotatably stationary said fastener assembly may be accurately preloaded.

References Cited

UNITED STATES PATENTS

| | | | |
|---|---|---|---|
| 454,019 | 6/1891 | Bassett | 151—5 |
| 610,879 | 9/1898 | Nesbitt | 151—5 |
| 622,041 | 3/1899 | Grant. | |
| 741,747 | 10/1903 | Walz | 151—17 |
| 835,217 | 11/1906 | Darst et al. | 151—17 |
| 845,137 | 2/1907 | Solomon | 151—15 |
| 1,067,455 | 7/1913 | Ballou | 151—6 |
| 1,410,724 | 3/1922 | Schank. | |
| 2,191,201 | 2/1940 | Kass | 151—19 |
| 3,237,665 | 3/1966 | Bass | 151—5 |

FOREIGN PATENTS

| | | |
|---|---|---|
| 399,010 | 6/1909 | France. |
| 722,839 | 1/1932 | France. |
| 737,048 | 9/1932 | France. |
| 197,324 | 4/1923 | Great Britain. |

MARION PARSONS, JR., *Primary Examiner.*

U.S. Cl. X.R.

151—5